May 7, 1935.  C. W. TERRY  2,000,675
MEANS FOR REGULATING THE OUTPUT OF A GENERATOR
Filed July 31, 1934
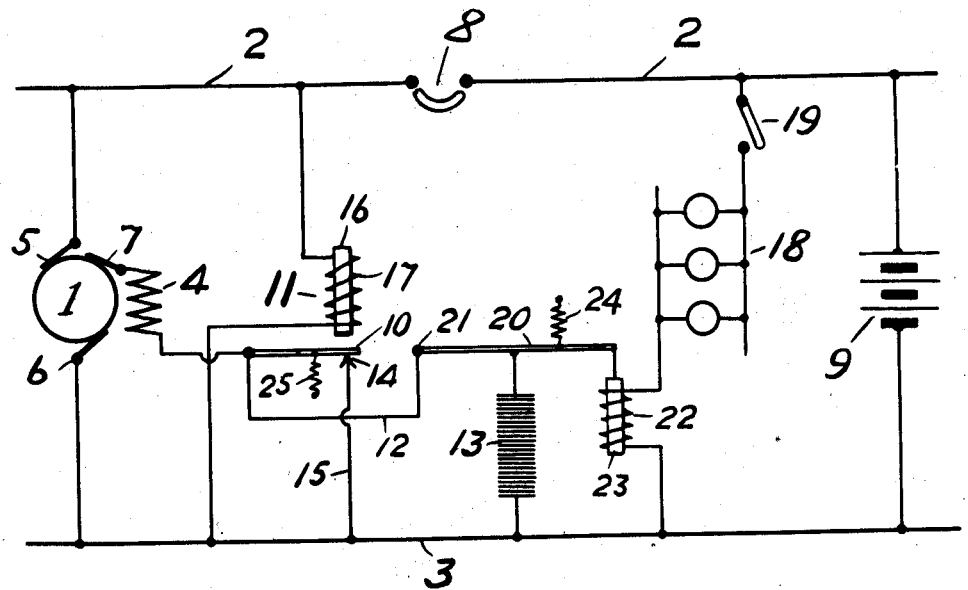
WITNESS:
INVENTOR
Charles W. Terry
BY
Augustus B Stoughton
ATTORNEY.

Patented May 7, 1935

2,000,675

UNITED STATES PATENT OFFICE 2,000,675

MEANS FOR REGULATING THE OUTPUT OF A GENERATOR

Charles W. Terry, Detroit, Mich., assignor to The Electric Storage Battery Company, Philadelphia, Pa., a corporation of New Jersey Application July 31, 1934, Serial No. 737,709

4 Claims. (Cl. 171—313)

This invention relates to systems in which a generator, which may be driven at variable speed, is employed to supply current for translation devices and a storage battery. The invention is especially adapted for use in connection with the starting and lighting systems on automobiles driven by internal combustion engines.

In systems of this character on account of space and weight limitation, the capacity of the generator is usually designed with little, if any, surplus above the actual requirements, and, in order to utilize the generator capacity to the fullest possible extent, it should be so controlled that its maximum output is always delivered to the translation devices and the battery except when the battery is so nearly fully charged that it is necessary, in order to avoid injurious overcharge, to reduce the output of the generator to avoid charging the battery at these excessive rates. When the output of the generator has thus been reduced with the translation devices disconnected so that the entire output of the generator is delivered as charging current to the battery, and the translation devices are then connected to the circuit, it is desirable that the additional load thus thrown on the system should be furnished in large part by the generator so that the battery shall continue to receive charging current. It is, however, in some cases desirable, when this additional load is thrown on, to reduce the charging rate of the battery to a still lower value in order to avoid applying excessive voltage to the translation devices, especially to the lamps, and thus avoid burning out or shortening the life of these lamps.

It is also desirable in systems of this character to so control the generator output as to protect the generator from excessive overload.

To accomplish these results, I have devised a system of generator control in which the generator delivers its full rated output when operating above the speed at which it is designed to deliver its rated capacity, whenever the battery is in such a state of charge that it can receive the surplus not required by the translation devices without excessive gassing or overheating. Under these conditions, the generator is so controlled that its output is automatically limited to its safe rated capacity. Of this output the translation devices, which are at the time connected to the circuit, will receive the current that they require and the battery will receive the balance as charging current.

When the battery has been charged to a point where this surplus current not required by the translation devices would cause excessive gassing, the output of the generator is reduced to a lower value such that the battery can safely receive even when there are no translation devices connected to the circuit, but, when translation devices are connected to the circuit, the output of the generator is automatically increased to furnish all or least a substantial part of this additional load.

My invention will be more clearly understood by referring to the following description taken in connection with the accompanying drawing, which illustrates diagrammatically a system embodying features of the invention.

In the drawing, 1 is a generator, here shown as of the third brush type, having main brushes 5 and 6 connected, respectively, to the conductors 2 and 3, and a third brush 7 to which is connected one terminal of the field-winding 4. The other terminal of this field-winding is connected to the armature 10 of a relay 11 and also by way of conductor 12 to one terminal of the carbon pile resistor 13, the other terminal of which is connected to conductor 3. Thus the carbon pile resistor 13 is connected in series between the field-winding 4 and the main brush 6.

The carbon pile 13 is normally short-circuited, when the contact 14 of relay 11 is closed, by way of armature 10, contact 14 and conductor 15. The armature 10 is acted upon by the iron core 16 of solenoid 17, the latter being connected across the circuit 2—3, whereby it is responsive to the voltage across this circuit.

Connected across conductors 2 and 3 are also shown the battery 9 and a load circuit 18, the latter being provided with a switch 19 for connecting and disconnecting this circuit to and from conductor 2. An automatic switch 8 is shown interposed in conductor 2 between the generator on the one hand and the battery and load circuit on the other, this switch being of the usual design for connecting the generator to the battery when the generator voltage reaches the desired value and for disconnecting the generator when its voltage falls below a certain value. The details of this switch are not shown as they form no part of the present invention. The carbon pile 13 is acted upon by the variable pressure produced by the lever 20 pivoted at 21. The pressure of this lever is produced by the pull of the solenoid 22 connected in series with the load circuit and acting upon the magnetic core 23 attached to the end of the lever 20 opposite the pivotal point 21. The weight of the lever and of the core 23 and, if desired, a portion of the pull due to the current in the solenoid 22, may be balanced by the spring 24.

The operation of this apparatus is as follows:

Under normal operating conditions, when the battery is partially discharged and the generator is operating above its normal full load speed, the operation will be substantially the same as in any automobile lighting system provided with a third brush generator, a battery and a load circuit. The generator output will be controlled at an approximately constant value equal to the full load rating of the machine which will be delivered to the translating devices and to the battery, the latter receiving any surplus of the generator output not required by the translating devices. So long as the battery is in a partially discharged condition, the voltage applied to the solenoid 17 will not be sufficient to open the contact at 14 against the pull of the spring 25, and the carbon pile 13 will be short-circuited by this contact as already described. When, however, the battery reaches a state approaching the fully charged condition, its voltage will rise to a point which will be sufficient to cause the relay 11 to open the contact at 14, thus putting the carbon pile 13 in series with the field-winding 4 and reducing the output of the generator in the well-known manner to a value which will depend upon the resistance of the carbon pile 13. If the load circuit 18 is disconnected at this time, there will be no current in the solenoid 22, and the pressure on the carbon pile 13 will be reduced to its minimum value and the resistance of the carbon pile 13 will be at its maximum value. Under these conditions, the design of the apparatus will be such as to reduce the output of the generator to a value low enough to avoid excessive gassing and excessive temperature of the battery. If the load circuit is now connected by closing the switch 19, current in the solenoid 22 will cause increased pressure on the carbon pile 13, thus reducing its resistance and correspondingly increasing the generator output. The design of the solenoid 22 may be such as to increase the generator output by an amount substantially equal to the additional load of the load circuit 18, or the design may be such that the increased output of the generator will be somewhat less than this increase of load, thus reducing the charging current into the battery, thereby lowering the voltage across the circuit 2—3 to avoid excessive voltage supplied to the load circuit.

I do not intend to be limited save as the scope of the prior art and of the attached claims may require.

I claim:—

1. In combination, a generator provided with field regulation adapted to limit its maximum output to a predetermined value, a storage battery, means for connecting the battery to the generator, translating devices adapted to be connected to and disconnected from the battery and the generator, a field-winding for the generator, a variable resistor in series with the field-winding, means responsive to the current of the translating devices for varying the resistance of the variable resistor, a circuit including a contact normally short-circuiting the resistor, and means responsive to battery voltage for opening the contact whereby the resistor is included in the circuit of the field-winding.

2. In combination, a generator provided with field regulation adapted to limit its maximum output to a predetermined value, a storage battery, means for connecting the battery to the generator, translating devices adapted to be connected to and disconnected from the battery and the generator, a field-winding for the generator, a resistor in series with the field-winding, means for reducing the resistance of the resistor when the load due to the translating devices is increased, a circuit including a contact normally short-circuiting the resistor, and means responsive to battery voltage for opening the contact whereby the resistor is included in the circuit of the field-winding.

3. In combination, a generator, regulating means for limiting the maximum output of said generator, a storage battery, means for connecting the battery to the generator, translating devices adapted to be connected to and disconnected from the battery and the generator, a field-winding for the generator, a variable resistor in series with the field-winding, means responsive to the current of the translating devices for varying the resistance of the variable resistor, a circuit including a contact normally short-circuiting the resistor, and means responsive to battery voltage for opening the contact whereby the resistor is included in the circuit of the field-winding.

4. An electric circuit including, in combination, a generator having the characteristics of limiting its maximum output to a predetermined value, translating devices, a storage battery, connections between said generator and said translating devices and said storage battery, a carbon pile, connections between said generator and said carbon pile such that the maximum output of said generator is reduced by an amount varying with the resistance of said carbon pile, a solenoid responsive to current passing through said translating devices and independent of current passing through said storage battery, a lever operated by said solenoid to decrease the resistance of said carbon pile in response to increase in current through said translating devices, a circuit short circuiting the connection of said carbon pile to said generator and a relay having a coil responsive to the voltage of said storage battery and an armature connected to open said last-mentioned circuit when the voltage of said storage battery rises to a predetermined value.

CHARLES W. TERRY.